June 15, 1954  S. T. SEMEGEN  2,681,096
METHOD OF MAKING GOLF BALL COVERS
AND COMPOSITION FOR THE SAME
Filed Feb. 7, 1950
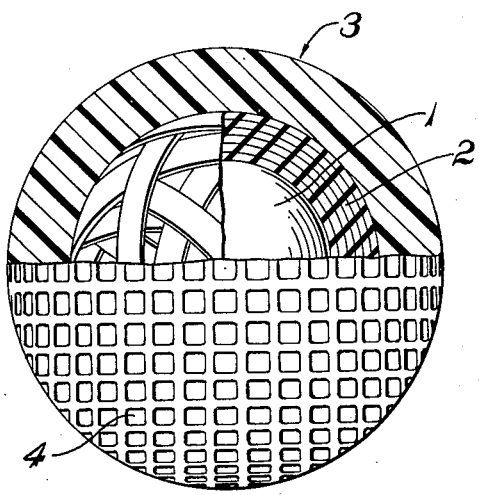
INVENTOR.
STEPHEN T. SEMEGEN
BY
ATTY.

Patented June 15, 1954

2,681,096

UNITED STATES PATENT OFFICE 2,681,096

METHOD OF MAKING GOLF BALL COVERS AND COMPOSITION FOR THE SAME

Stephen T. Semegen, Cuyahoga Falls, Ohio, assignor to The B. F. Goodrich Company, New York, N. Y., a corporation of New York Application February 7, 1950, Serial No. 142,950

19 Claims. (Cl. 154—17)

This invention relates to golf ball cover compositions and especially to covers comprising a long-chain polyamide.

It is an object of this invention to provide a composition suitable for golf ball covers which has improved cut-resistance.

It is an object to provide a golf ball cover composition having the necessary physical properties such as "click," toughness, processability, resistance to cutting, good rebound, and long life.

It is a further object to provide a composition, the ingredients of which are readily obtainable.

It is also an object to provide a method of processing the compositions of this invention into golf ball covers.

Other objects will be apparent from the description which follows.

It has been discovered that a linear super-polyamide commonly known as nylon, when compounded properly and applied to golf ball centers using particular methods, provides excellent covers that have improved properties over any other covers. The drawing is an elevation partly in section of a golf ball made in accordance with the present invention. It comprises core 1, rubber thread center 2, and a nylon cover, indicated generally at 3, which has been molded into a coherent, continuous mass from a crumb mixture of nylon and water. The numeral 4 indicates the general surface pattern of the ball.

The particular linear super-polyamide used is not critical; however, certain super-polyamides are preferred because they are more easily processed. The preferred synthetic linear super-polyamides are those having a minor proportion of the amido hydrogen atoms replaced with alkoxymethyl or alkoxyethyl radicals. Such polyamides have a linear polymeric structure containing recurring

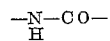

groups, from 1 to about 15% of the amido hydrogen atoms being replaced by alkoxymethyl or alkoxyethyl radicals to give recurring groups of the structure

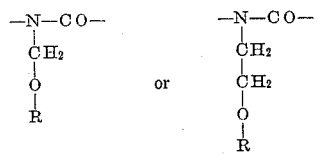

where R is an alkyl group having from one to eight carbon atoms, preferably from one to three carbon atoms, of which the methoxymethyl and ethoxymethyl substituted linear polyamides are most desirable. The preferred polyamides differ from the corresponding unsubstituted polyamides in having lower softening points, lower melting points, and greater softness, and in having a much higher moisture absorption. The moisture absorption of the preferred polyamides is 15 to 30% (water saturated at 25° C.) while that of the unsubstituted polyamides is less than half as much. This very high moisture absorption facilitates processing and forming of the polyamide into golf ball covers.

These long-chain polyamides may be mixed with pigments and a plasticizer and processed into golf ball covers as follows:

*Example I*

|  | Parts by weight |
|---|---|
| Long-chain polyamide (3% methoxymethyl substituted) | 73 |
| Titanium dioxide | 2 |
| Water | 25 |

The substituted super-polyamide and titanium dioxide, in finely-divided form, are dry mixed and then the water added and the mixture stirred thoroughly. This wet-crumb mixture is then dropped onto a conventional rubber roll mill which is at an optimum temperature of from 100° to 130° F. The material is formed into sheets on the mill in from one to three minutes and the stock cut from the mill. Pieces or pellets of the sheeted composition are cut and placed in golf ball cover shell molds and by application of heat and pressure hemi-spherical hollow shells are produced. When the shell-forming mold and the composition are at room temperature before placement in the press, the press platen temperature should be from 275° to 325° F. Best results are obtained if the temperature of the super-polyamide composition is from about 175° to 200° F. during the molding operation. By proper control of the length of time the mold is in the press, which time will vary depending upon the design of the mold and press, it is possible to control the maximum temperature reached. The shells are cooled in the mold and then removed.

After these shells are trimmed, golf ball centers of conventional construction made by winding rubber threads under tension on a core are inserted between pairs of shells and the whole placed in a mold. The press platen temperature should be from 275° to 325° F. The time in the mold should be set so that the temperature of the center does not exceed 225° F. The cover composition is preferably heated to from about 200° to 225° F. during this step. The balls are then cooled while in the mold, unloaded, buffed and painted.

*Example II*

| | Parts by weight |
|---|---|
| Linear super-polyamide (3% methoxymethyl substituted) | 78 |
| Titanium dioxide | 2 |
| Water | 20 |

The pigment and polyamide are dry mixed, the water added, and the mixture sheeted out on a mill, stamped and molded, and the shells used to make balls as described in Example I.

*Example III*

| | Parts by weight |
|---|---|
| Linear super-polyamide (3% methoxymethyl substituted) | 63 |
| Titanium dioxide | 2 |
| Water | 35 |

The pigment and polyamide are dry mixed, the water added, and the mixture sheeted out on a mill, stamped and molded, and the shells used to make balls as described in Example I.

*Example IV*

| | Parts by weight |
|---|---|
| Linear super-polyamide (3% methoxymethyl substituted) | 75 |
| Water | 25 |

These constituents are mixed on a mill, stamped and molded, and the shells used to make balls as in Example I.

There are several possible modifications which may be made in the process of Example I. For instance, it has been found that if the golf ball centers are stored in a Dry Ice chest for from 2 to 24 hours before combining with the cover shells, there is less likelihood of the tensioned rubber threads of the center relaxing during the molding step with resulting loss of flight distance of the completed ball. By such an expedient it is possible to get adequate flow of the cover composition to provide a perfectly molded cover without much danger of damaging the golf ball center due to excessive temperatures. It is also possible to charge the shell-forming mold with wet-crumbs, eliminating the milling step of Example I.

In order to improve the bond between the cover and golf ball center it is advisable to treat the centers before the covers are applied thereto by dipping in a 2 to 3% solution of an unsubstituted long-chain polyamide in ethyl alcohol. If desired, the alkoxymethyl- or alkoxyethyl-substituted superpolyamide used for the cover may also be used in the coating solution, in which case it is preferred that the solution contain from 10% to 20% by weight of such super-polyamide in alcohol. After dipping, the centers are allowed to dry for several hours to ensure complete evaporation of the solvent before the covers are applied. Any volatile solvent for the polyamide may be used in the solution, but it is preferably acetone or a lower alcohol such as methyl, ethyl, propyl or isopropyl alcohol. Although it is preferred to coat the center by immersing it in the desired solution, the solution may also be applied by brushing or spraying it on the center or in any other suitable manner.

The completed balls have excellent cut-resistance. The driving distance is better than like-quality balata-covered balls. Balls made with "frozen" centers and the covers of this invention generally have a greater driving range than those made with uncooled centers.

The original water content of the cover composition immediately after mixing may vary from 20 to 60% by weight of the substituted polyamide. Of course, when starting with a water concentration of about 25%, a loss of water takes place during the milling step (about 10%), during the shell-forming step (about 5%), and during the ball-molding step (about 5%), resulting in a final water content of about 5% in the cover. If a larger amount of water is present in the original composition, a somewhat larger amount, up to 10% or 15% by weight, will remain in the finished cover. This residual water is largely lost during the storage period before application of the oil base paint used for the final finish.

If titanium dioxide is added, it is preferably added in amounts which give a content of from ½% to 3% by weight of the polyamide. Other compounding ingredients may be used. For example, pigments other than titanium dioxide such as zinc stearate and zinc oxide may be added alone or along with titanium dioxide. The zinc compounds may be added alone in amounts which give a content of from ½% to 5% by weight of the polyamide. If both titanium and zinc compounds are added they should preferably be added in amounts which give a pigment content of from about ½% to 10% by weight of the polyamide.

My invention is not limited by the specific examples listed herein for illustration. Rather the invention covers those compositions of super-polyamides as defined in the following claims.

I claim:

1. A composition of matter in the form of crumbs comprising a substituted long-chain linear super polyamide wherein the amide groups are separated by hydrocarbon groups containing at least two carbon atoms, having a moisture absorption of 15 to 30% (water saturated at 25° C.) and wherein from 1 to 15% of the amido hydrogen atoms have been replaced with alkoxyalkyl radicals to give recurring groups of the structure

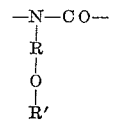

in which R is an alkyl group having from 1 to 2 carbon atoms and R' is an alkyl group having from 1 to 8 carbon atoms and from 20 to 60% by weight based on the weight of the substituted polyamide of water.

2. A composition of matter according to claim 1 containing additionally from ½ to 10% by weight based on the weight of said polyamide of a pigment selected from the group consisting of titanium dioxide, zinc oxide and zinc stearate.

3. A composition of matter according to claim 2 wherein the polyamide is an alkoxymethyl substituted linear polyamide.

4. A composition of matter according to claim 2 wherein the polyamide is a methoxymethyl substituted linear polyamide.

5. A composition of matter according to claim 2 wherein the polyamide is an ethoxymethyl substituted linear polyamide.

6. A composition of matter according to claim 2 wherein the polyamide is an alkoxyethyl substituted linear polyamide.

7. A composition of matter in the form of wet crumbs and consisting essentially of 73 parts by weight of a long-chain linear super polyamide wherein the amide groups are separated by hydrocarbon groups containing at least two carbon atoms and in which 3% of the amido hydrogen atoms have been substituted with methoxymethyl radicals, 2 parts by weight of titanium dioxide, and 25 parts by weight of water.

8. The method which comprises mixing a particulate long-chain linear super polyamide wherein the amide groups are separated by hydrocarbon groups containing at least two carbon atoms and having a moisture absorption of from 7 to 30% (water saturated at 25° C.) and from 20 to 60% by weight based on the weight of said polyamide of water to provide a composition in the form of crumbs, hot-forming said composition into hemispherical shells and hot-pressing said shells about a golf ball center to form a cover thereon.

9. The method according to claim 8 wherein from ½ to 10% based on the weight of the polyamide of a pigment selected from the group consisting of titanium dioxide, zinc oxide and zinc stearate is mixed with the polyamide and water.

10. The method which comprises mixing a particulate long-chain linear super polyamide wherein the amide groups are separated by hydrocarbon groups containing at least two carbon atoms, having a moisture absorption of 15 to 30% and wherein from 1 to 15% of the amido hydrogen atoms have been replaced with alkoxyalkyl radicals to give recurring groups of the structure

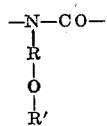

in which R is an alkyl group having from 1 to 2 carbon atoms and R' is an alkyl group having from 1 to 8 carbon atoms and from 20 to 60% by weight based on the weight of the substituted polyamide of water to provide a composition in the form of crumbs, hot-forming said composition into hemispherical shells and hot-pressing said shells about a golf ball center to form a cover thereon.

11. The method according to claim 10 wherein from ½ to 10% by weight based on the weight of the substituted polyamide of a pigment selected from the group consisting of titanium dioxide, zinc oxide and zinc stearate is mixed with the substituted polyamide and water.

12. The method according to claim 11 containing the additional step of milling said composition to form sheets prior to hot-forming hemispherical shells therefrom.

13. The method according to claim 12 containing the additional steps of coating said center with a solution of a long-chain linear super polyamide wherein the amide groups are separated by hydrogen groups containing at least two carbon atoms in a volatile solvent and drying said coating and cooling said coated center prior to pressing said shells thereabout.

14. The method according to claim 13 wherein the polyamide is an alkoxymethyl substituted long-chain linear super polyamide.

15. The method according to claim 13 wherein the polyamide is a methoxymethyl substituted long-chain linear super polyamide.

16. The method according to claim 13 wherein the polyamide is an ethoxymethyl substituted long-chain linear super polyamide.

17. The method according to claim 13 wherein the polyamide is an alkoxyethyl substituted long-chain linear super polyamide.

18. The method which consists essentially of mixing 73 parts by weight of a particulate long-chain linear super polyamide wherein the amide groups are separated by hydrocarbon groups containing at least two carbon atoms and in which 3% of the amido hydrogen atoms have been substituted with methoxymethyl radicals and 2 parts by weight of titanium dioxide to form a dry mixture, stirring 25 parts by weight of water with said dry mixture to form wet crumbs, milling said mixture at a mill temperature of from 100 to 130° F. to form a sheet, forming hemispherical shells from portions of said sheet by hot-pressing at temperatures of from 175 to 200° F., hot-pressing said shells at temperatures of from 200 to 225° F. about a golf ball center to form a cover thereon for a time insufficient to heat the center above 225° F., mold cooling, unloading said covered golf ball center from the mold, buffing the cover and painting the cover.

19. The method which comprises mixing a particulate long-chain linear super polyamide wherein the amide groups are separated by hydrocarbon groups containing at least two carbon atoms and having a moisture absorption of from 7 to 30% (water saturated at 25° C.) and from 20 to 60% by weight based on the weight of said polyamide of water to provide a composition in the form of crumbs, milling said crumbs to form sheets, hot-forming said sheets into hemispherical shells and hot-pressing said shells about a golf ball center to form a cover thereon.

References Cited in the file of this patent

UNITED STATES PATENTS

| Number | Name | Date |
|---|---|---|
| 700,657 | Kempshall | May 20, 1902 |
| 707,595 | Kempshall | Aug. 26, 1902 |
| 1,198,366 | Martin et al. | Sept. 12, 1916 |
| 2,004,167 | Madge | June 11, 1935 |
| 2,050,402 | Walsh | Aug. 11, 1936 |
| 2,109,948 | Olin | Mar. 1, 1938 |
| 2,188,285 | Merrill | Jan. 23, 1940 |
| 2,205,722 | Graves | June 25, 1940 |
| 2,252,554 | Carothers | Aug. 12, 1941 |
| 2,302,332 | Leekley | Nov. 17, 1942 |
| 2,314,964 | Young | Mar. 30, 1943 |
| 2,320,088 | Leekley | May 25, 1943 |
| 2,341,759 | Catlin | Feb. 15, 1944 |
| 2,342,387 | Catlin | Feb. 22, 1944 |
| 2,359,878 | Schupp, Jr. | Oct. 10, 1944 |
| 2,467,186 | Cairns | Apr. 12, 1949 |
| 2,499,344 | Smith | Feb. 28, 1950 |
| 2,502,340 | Pickens | Mar. 28, 1950 |

FOREIGN PATENTS

| Number | Country | Date |
|---|---|---|
| 620,208 | Great Britain | Mar. 22, 1949 |